No. 648,952. Patented May 8, 1900.
J. H. HANSON.
AUTOMATICALLY CONTROLLED STOCK WATERING TROUGH.
(Application filed Dec. 21, 1899.)
(No Model.) 2 Sheets—Sheet 1.

Witnesses.
Robert Everitt
J. Granville Meyers

Inventor.
John H. Hanson.
By H. L. Davis
Atty.

No. 648,952. Patented May 8, 1900.
J. H. HANSON.
AUTOMATICALLY CONTROLLED STOCK WATERING TROUGH.
(Application filed Dec. 21, 1899.)
(No Model.) 2 Sheets—Sheet 2.
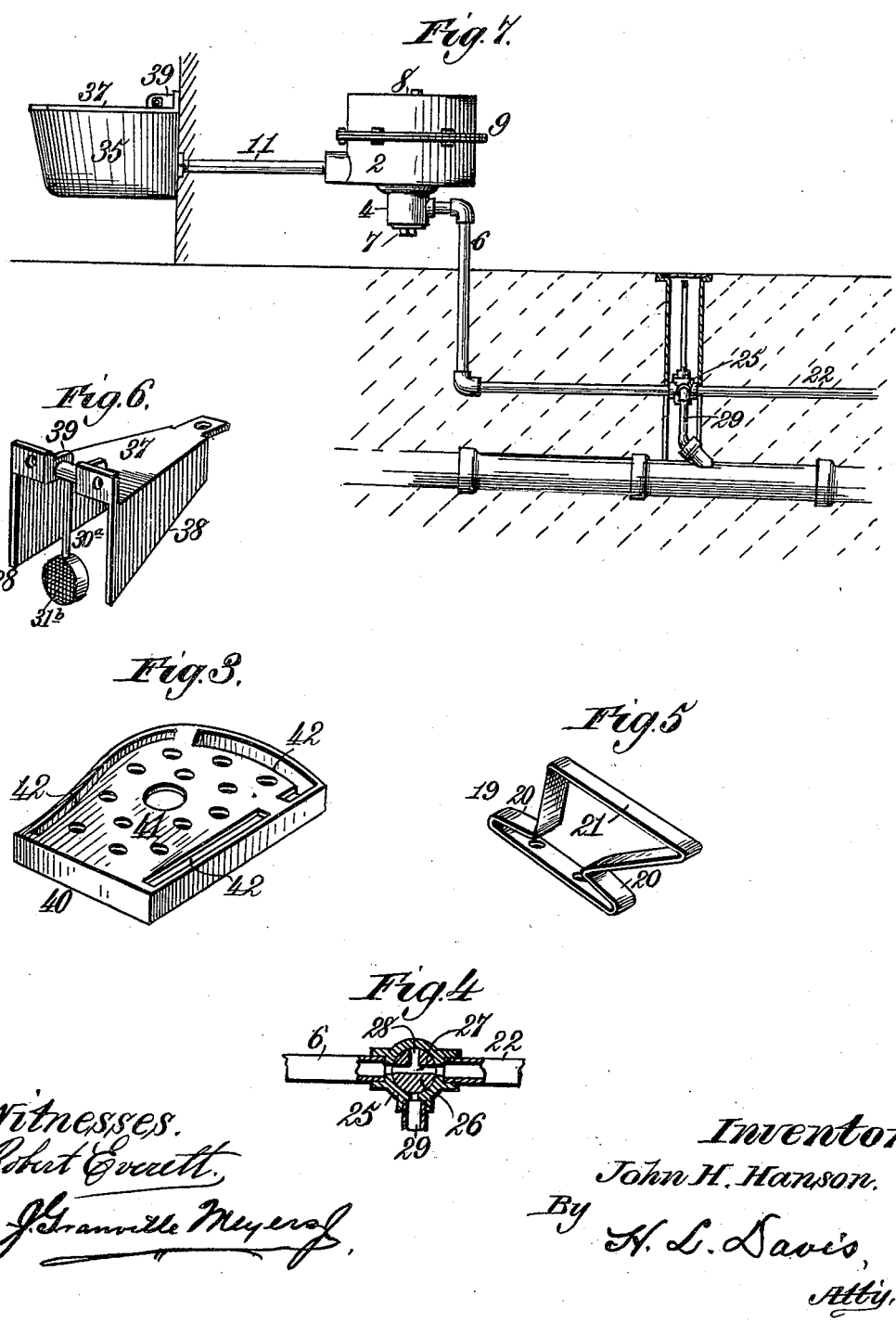
Witnesses.
Robert Everett.
J Granville Meyers
Inventor.
John H. Hanson.
By H. L. Davis,
Atty.

UNITED STATES PATENT OFFICE.

JOHN H. HANSON, OF OAKLAND, NEBRASKA.

AUTOMATICALLY-CONTROLLED STOCK-WATERING TROUGH.

SPECIFICATION forming part of Letters Patent No. 648,952, dated May 8, 1900.

Application filed December 21, 1899. Serial No. 741,090. (No model.)

*To all whom it may concern:*

Be it known that I, JOHN H. HANSON, a citizen of the United States, residing at Oakland, in the county of Burt and State of Nebraska, have invented certain new and useful Improvements in Automatically-Controlled Stock-Watering Troughs; and I do hereby declare the following to be a full, clear, and exact description of the invention, such as will enable others skilled in the art to which it appertains to make and use the same.

This invention relates to certain new and useful improvements in automatically-controlled stock-watering troughs; and it has for its object to improve the construction generally of this class of devices and to render their operation automatic and sure.

One object of the invention is to provide an improved form of watering-trough with a removable false bottom so arranged that the trough can be readily and quickly cleaned, which is a very desirable feature in devices of this type.

Another purpose of the invention is to provide a novel form of valve adapted to regulate and control the flow of water to the trough in such manner that the trough will always be supplied with a certain predetermined amount of water, but will not overflow.

It is a still further purpose of the invention to provide means for easily and quickly draining the watering-trough, supply-pipes, and valve-chamber to prevent freezing and at the same time shutting off the supply of water to these parts, this operation being effected through the medium of a three-way cock.

To these and other ends the invention comprises the features of construction and combination and arrangement of parts hereinafter described in detail and then more definitely pointed out in the claims which conclude this specification.

In order to enable others to understand, make, and utilize my said invention, I will proceed to describe the same in detail, reference being made for this purpose to the accompanying drawings, in which—

Figure 1:
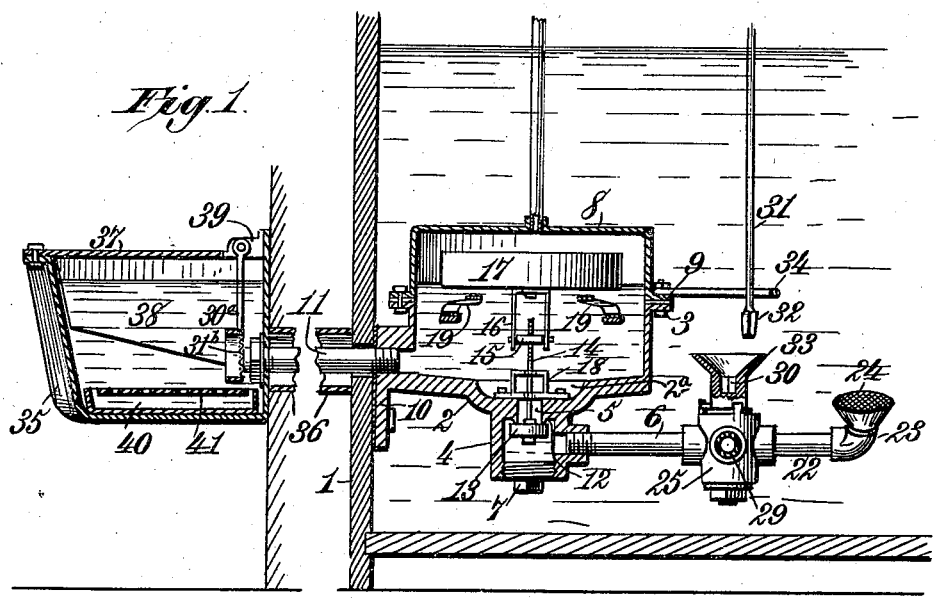
Figure 2:
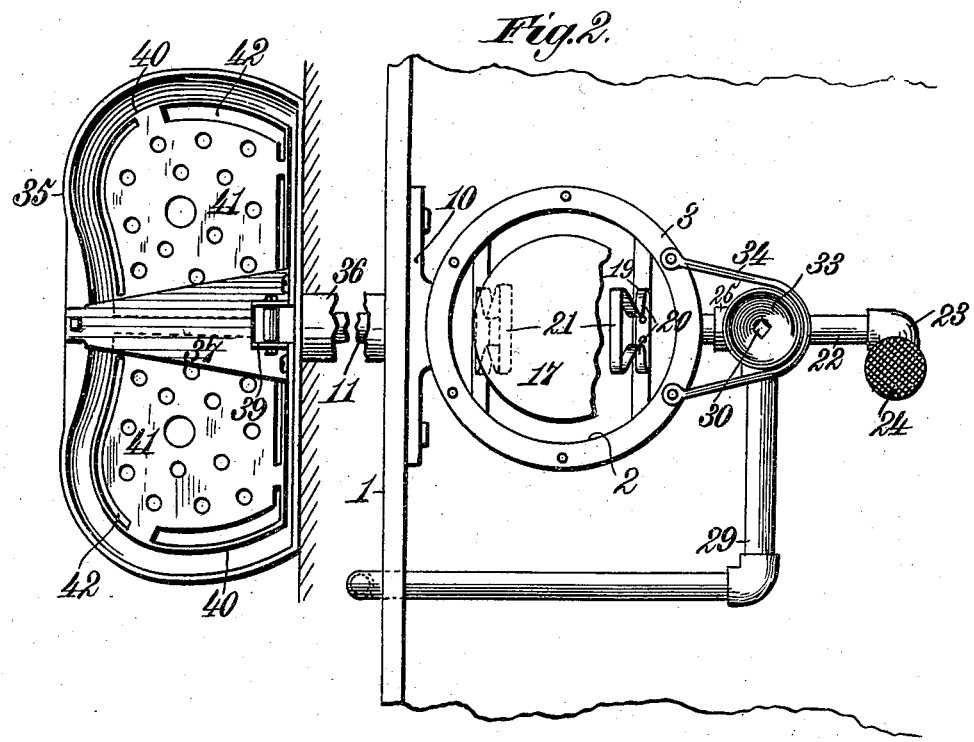

Figure 1 is a longitudinal sectional view of a portion of a water-supply tank, showing my improved valve-regulating means located therein and also showing the watering-trough in section and communicating therewith. Fig. 2 is a plan view of the same. Fig. 3 is a perspective view of one of the removable false-bottom sections. Fig. 4 is a detail sectional view of the three-way cock. Fig. 5 is a detail perspective view of one of the adjustable supports for the float-valve. Fig. 6 is a detail perspective view of a part of the watering-trough shown removed. Fig. 7 is a side elevation of the complete watering apparatus shown connected to a water-main.

In the drawings, Fig. 1, I have illustrated my invention in connection with a supply-tank; but I wish it here understood that the same may be employed in connection with a water-main or other suitable source of water-supply without departing from the spirit of my invention, the supply-tank being chosen simply for the sake of illustration.

Referring to the drawings, the reference-numeral 1 designates a supply-tank that can be kept supplied with water from any suitable source, and within this tank, near the bottom thereof, is located a water-chamber comprising a lower cylindrical section 2, having a circumferentially-flanged upper edge 3 and a depending tubular extension 4, forming a valve-chamber, which communicates with the water-chamber through an opening 5. The said tubular extension 4 is provided with an inlet-pipe 6 at one side and a removable plug 7 at the bottom. The top of the water-chamber comprises a cylindrical dome 8, having a circumferential flange 9, which rests upon the flange 3, and the parts are then firmly bolted together, with an interposed gasket of leather or rubber to form a water-tight closure. The lower section of the water-chamber is preferably provided with a side bracket 10, by which said chamber may be secured in position within the tank 1, and leading from the lower part of the chamber at one side is an outlet-pipe 11, which extends through an opening in the side of the tank and leads to the watering-trough hereinafter referred to and which may be located at any convenient or desired place.

Within the valve-chamber, below the opening 5, is a sharp-edged valve-seat 12, against which seats a valve 13, said valve being supported by means of a stem 14, having an adjustable threaded connection at its upper end with a nut 15, which is pivoted at opposite sides to a bracket 16, secured to the under side of a float 17. The said stem 14 is guided and held in a true vertical position by means of a guide 18, secured to the bottom of the water-chamber, and the float 17 is supported against downward movement in an adjustable manner by means of extensible metal supports, formed, preferably, from ductile metal loops 19, the opposite sides of which are bent toward each other, as shown at 20, leaving a flat top 21, upon which the valve may rest on its limit of downward movement. These ductile metal supports may be readily adjusted by bending them up or down until the proper point is reached to give the necessary drop to the float which will regulate the movement of the valve to and from its seat, while the threaded connection of the stem 14 with the nut 15 will enable the lengthening and shortening of the connection between the stem and float to adjust the latter to regulate the depth of water desired in the trough.

Communicating with the pipe 6, leading into the valve-chamber, is a pipe 22, having a tubular extension 23, set at an angle of about forty-five degrees, said extension being provided with a flaring end which is covered by a screen 24, said tubular extension being open to receive water from the tank 1 through the screen, as will hereinafter appear. By disposing the extension 23 at an angle, as described and shown, sediment will not be likely to collect on the screen, which would tend to choke or clog the same. At a point intermediate the pipes 6 and 22 I provide a valve-casing 25, within which is located a three-way cock or valve 26, having a straightway port 27, which may be brought into position to open up communication between pipes 6 and 22, and is also provided with a branch port 28, arranged at right angles to and intersecting port 27, which may be brought into communication with a drain-pipe 29, leading from the three-way-valve chamber 25 and discharging to the outside of the tank, where the waste or drain water may be conducted away, as desired. It will be understood that when the straightway port 27 is in communication with the pipes 6 and 22 the branch port 28 will be closed, as shown in Fig. 4, allowing the water to flow through said pipes into the valve-chamber 4 and water-chamber, and when the branch port 28 is caused to communicate with the drain-pipe 29 the inlet-pipe 22 will be closed and the pipe 6 opened, allowing the water in the trough, water-chamber, valve-chamber and pipe 6 to flow back and out through the said drain-pipe 29. It will thus be seen that I am enabled with a single three-way cock and a single set of pipes to supply water to the water-chamber and trough and also to drain these parts with efficiency and despatch to prevent freezing and for cleansing purposes.

In order to operate the three-way cock, I provide the same with an angular socket 30, into which may be inserted an operating-rod 31, having an angular head 32, shaped to fit said socket. The said rod is guided into the socket by means of a flaring or cup-shaped mouth 33, which will cause the rod to easily find its way home, and in order to readily center the rod in position over the said flaring mouth I have provided a guiding loop or bracket 34 above the mouth, said bracket being bolted at its ends to the water-chamber, as shown. I provide these devices in case it is desired to use a removable operating-rod for the valve; but it will be understood that I may, if desired, employ a permanently-attached operating-rod.

My improved form of trough, which I will now describe, comprises a cast-metal body portion 35, of preferably the form shown, the same being provided with rounded corners and flaring sides to facilitate cleaning. This trough may be located at any desired place, either within the barn or outside, and supported in any suitable manner, or it may be attached directly to the tank, and it has communication with the latter by means of the pipe 11, heretofore referred to, which pipe may be and preferably is inclosed by means of a larger pipe 36, providing an intermediate air-space to protect the said pipe 11 against freezing. Across the top of the trough, at the middle, is a plate 37, provided upon opposite sides with depending wings 38, and journaled or pivoted in lugs or brackets 39, struck up from said plate, is a swinging support $30^a$, carrying a strainer $31^b$ at its lower end, which normally covers the open end of the pipe 11. The operation of this swinging support is to allow the strainer to move forward during the inflow of water through the pipe into the trough, but to lie closely over and cover said pipe when the trough is being drained, thereby preventing sediment, straw, or other refuse from flowing back into the water and valve chambers, which would be likely to clog these parts. In order to more readily clean the drinking-trough and remove the sediment therefrom, I have provided the same with two removable bottom-sections 40, made to fit the bottom of the trough and each comprising a pan or tray having a perforated top 41, which top does not completely cover the tray, as will be seen, spaces 42 being left at two or more side edges to facilitate cleaning. By means of these removable trays the trough can be easily and quickly cleaned, thus providing pure water for the stock at all times and with little trouble.

I have heretofore stated that the water-chamber and valve mechanism may be connected directly to a water main or pipe instead of being submerged into a tank, as shown, and when used in this manner the extension 23 will be dispensed with and the pipe 22 connected directly with the water main or pipe, as shown in Fig. 7.

The operation of the device is as follows, assuming that the parts are in the position shown in Fig. 1, in which the float-valve is closed and the three-way cock turned to allow the water to flow through the same and through the pipes 22 and 6, the water-chamber and trough being supplied with water to the required level, which is regulated and determined by the adjustment of the float-valve. Suppose now that an animal should drink a quantity of water from the trough. The water-level in the trough and water-chamber will immediately fall, causing the float to gradually drop and the valve to open, which allows an additional inflow of water into the water-chamber and trough until the determined water-level in these chambers or parts again reaches the normal, when the float will again rise, drawing the valve to its seat and shutting off the further inflow of water, which operation is repeated every time any water is taken from the trough through the act of drinking or otherwise drawing off the water. If now it is desired to drain the trough, water-chamber, valve-chamber, and pipe 6 to prevent freezing or for cleansing purposes, the three-way cock is turned so that the branch port registers with the drain-pipe and communication with the water-supply pipe 22 is closed. The water will then flow back from the watering-trough, valve-chamber, and intermediate pipes or passages and out through the said drain-pipe, where it may be conducted away to any desired place.

The valve-seat 12 of the float-valve is comparatively sharp, and the action of the valve 13 thereupon serves to cut off tender growths, while the swirling of the water passing through the port or opening 5 acts to remove such growths, thereby insuring an absolutely-tight closing of the valve. The said valve extends slightly beyond the sharp-edged valve-seat, and thus furnishes a grasp for the receding waters to aid in opening said valve when draining begins.

In constructing the water-chamber I prefer to form a central depression 2ª in the bottom thereof around the port or opening 5, which is designed to catch and hold sediment, if any such should work into the water-chamber, such sediment being again taken up and carried back into the trough with the water when the same is admitted. The reflow of water in draining being much slower than the inflow, sediment is likely to lodge in the water-chamber instead of working into the drainage-pipe, and I have thus provided the depression 2ª to catch such sediment and hold it in the water-chamber, where it will be held temporarily until the inflow of water again takes place, when it will be carried by the water back into the trough.

What I claim is—

1. In an apparatus for watering stock, the combination with a water-supply pipe, of a trough supplied with water from said pipe, means controlled by the water for automatically regulating the flow of the latter to the trough, a drain-pipe communicating with the water-supply pipe, and a three-way cock located at the point of connection between the drain-pipe and water-supply pipe, substantially as and for the purpose described.

2. In an apparatus for watering stock, the combination with a water-supply pipe, of a water-chamber, a valve-chamber, a watering-trough communicating with said water-chamber, a valve in the valve-chamber, a float in the water-chamber, a stem connecting said valve and float, and an extensible support for the float, substantially as described.

3. In an apparatus for watering stock, the combination with a water-supply pipe, of a water-chamber, a watering-trough supplied from said water-chamber, a valve controlling the flow of water into said water-chamber, a drain-pipe communicating with the water-supply pipe, and a three-way cock located at the point of connection of the drain-pipe with the water-supply pipe, substantially as described.

4. In an apparatus for watering stock, the combination with a water-supply pipe, of a water-chamber, a watering-trough supplied from said water-chamber, a valve controlling the flow of water into said chamber, a drain-pipe communicating with the water-supply pipe, a three-way cock located at the point of connection of the drain-pipe and water-supply pipe and serving to alternately direct the flow of water through these pipes, a socket in the head of the cock to receive an operating part, and a flaring mouth surrounding said socket, substantially as described.

5. In an apparatus for watering stock, the combination with a tank, of a water-supply pipe located therein and having an open flaring end disposed at an angle of about forty-five degrees, a screen covering the open end of said pipe, a water-chamber, a watering-trough supplied from said water-chamber, and a valve controlling the flow of water to said chamber, substantially as described.

6. In an apparatus for watering stock, the combination with a water-supply pipe, of a water-chamber, a float-valve controlling the flow of water to said chamber, a watering-trough, a pipe leading from said water-chamber to the trough, a swinging screen normally resting over the end of said pipe in the trough, a drain-pipe communicating with the water-supply pipe, and a three-way cock located at the point of connection of the drain-pipe with the water-supply pipe, substantially as described.

7. A watering-trough provided with removable trays having perforated tops, substantially as described.

8. A watering-trough provided with removable trays each having a perforated top, with elongated openings around the edges thereof to facilitate cleaning, substantially as described.

9. In a watering-trough, a combined water inlet and outlet pipe, entering said trough, and a swinging screen normally resting over the open end of said pipe, substantially as described.

10. In combination with a watering-trough, a combined water inlet and outlet pipe entering the same, a swinging screen normally resting over the open end of said pipe, and guard-plates located within the trough upon opposite sides of the screen, substantially as described.

In testimony whereof I affix my signature in presence of two witnesses.

JOHN H. HANSON.

Witnesses:
VICTOR L. FRIED,
JOHN J. McCOURT.